(12) United States Patent
Karpowich

(10) Patent No.: US 6,725,978 B2
(45) Date of Patent: Apr. 27, 2004

(54) CABLE JOINING SYSTEM FOR CYCLES

(76) Inventor: John Walter Karpowich, 6540 Hayvenhurst Ave., Lake Balboa, CA (US) 91406

( * ) Notice: Subject to any disclaimer, the term of this patent is extended or adjusted under 35 U.S.C. 154(b) by 0 days.

(21) Appl. No.: 10/164,123

(22) Filed: Jun. 5, 2002

(65) Prior Publication Data

US 2003/0226721 A1 Dec. 11, 2003

(51) Int. Cl.[7] .................................................. B62L 3/00
(52) U.S. Cl. .................. 188/20; 188/24.22; 188/106 P; 188/24.11; 74/489; 74/480 R; 74/502.4
(58) Field of Search ........................... 188/24.11, 24.12, 188/20, 106 P, 24.22; 74/439.01, 480 R, 490.14, 500.5, 502.4, 502.6, 489, 551.8; 248/65, 68.1; 280/288.4

(56) References Cited

U.S. PATENT DOCUMENTS

| | | | | |
|---|---|---|---|---|
| 3,905,242 A | * | 9/1975 | Hoffman | .................. 74/480 R |
| 4,770,435 A | * | 9/1988 | Cristie | ........................ 280/279 |
| 4,901,595 A | * | 2/1990 | Ozaki et al. | ................ 74/502.2 |
| 4,930,798 A | * | 6/1990 | Yamazaki et al. | .......... 280/261 |
| 5,005,674 A | * | 4/1991 | Piatt | ......................... 188/24.11 |
| 5,094,322 A | * | 3/1992 | Casillas | .................... 188/24.22 |
| 5,263,671 A | * | 11/1993 | Baum | ......................... 248/68.1 |
| 5,431,255 A | * | 7/1995 | Tsuchie | .................... 188/24.16 |
| 5,626,058 A | * | 5/1997 | Karpowich et al. | ........... 74/489 |
| 5,941,125 A | * | 8/1999 | Watarai et al. | ........... 74/473.14 |
| 6,354,545 B1 | * | 3/2002 | Liao | ........................... 248/214 |

* cited by examiner

Primary Examiner—Jack Lavinder
Assistant Examiner—Bradley T King
(74) Attorney, Agent, or Firm—Marshall E. Rosenberg

(57) ABSTRACT

An auxiliary braking system for supplementing an existing bicycle braking system is disclosed. The brake wire of the auxiliary braking system is removably secured to an existing primary brake wire, so that the actuation of the auxiliary braking system causes the main brake wire to pull and activate the caliper brakes. The interconnection of the auxiliary brake wire to the main brake wire is achieved through a housing joiner which secures the auxiliary brake wire to the top tube of the bicycle frame and a bullet clamp which creates a secure connection between the main brake wire and the auxiliary brake wire.

7 Claims, 4 Drawing Sheets

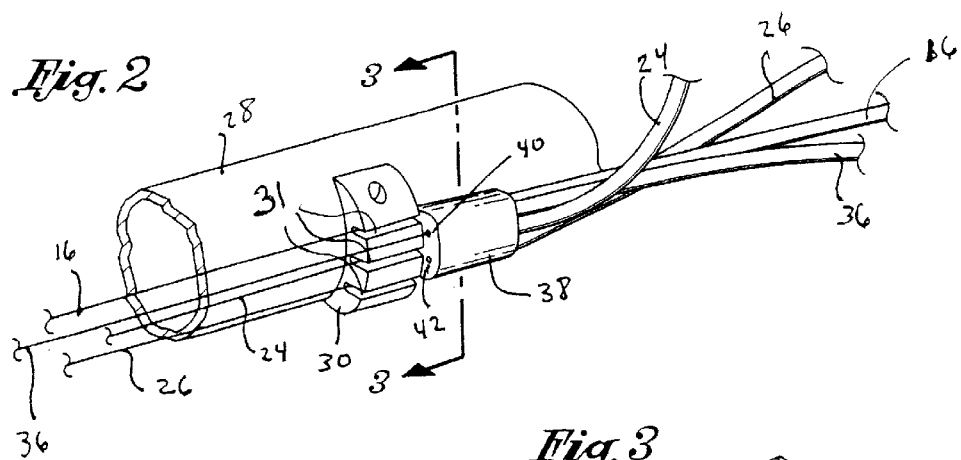
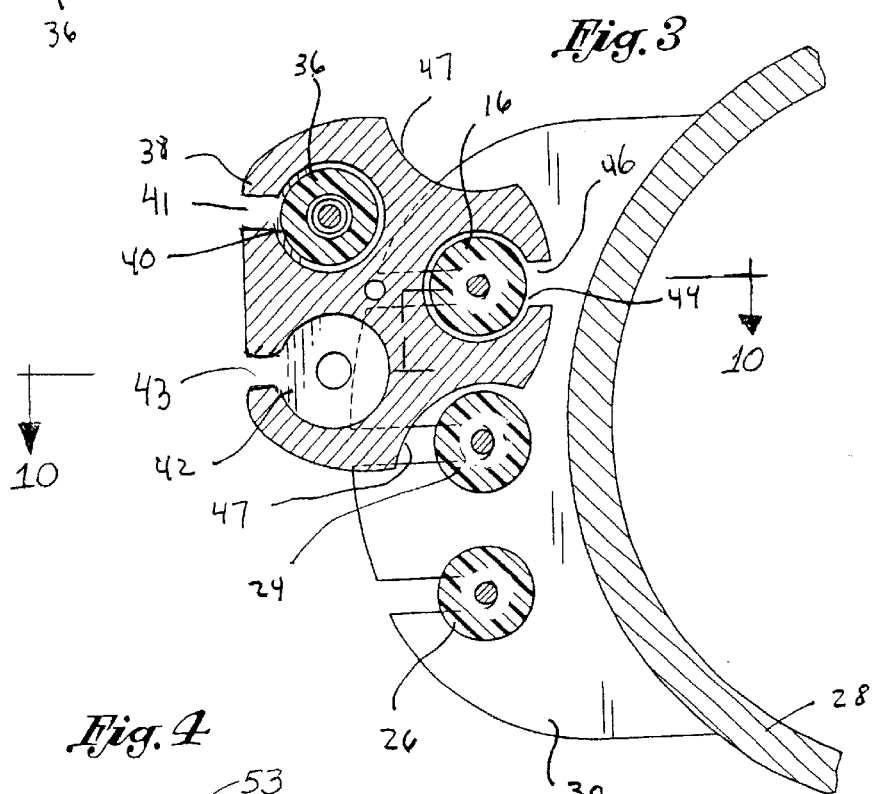
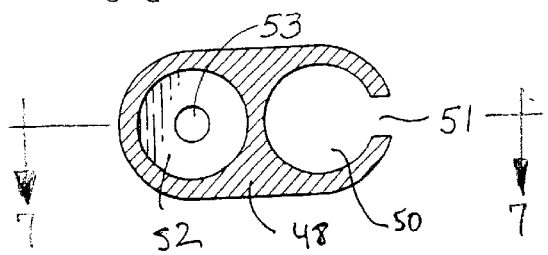

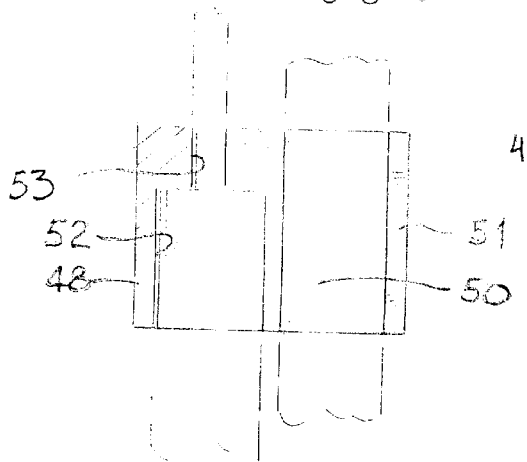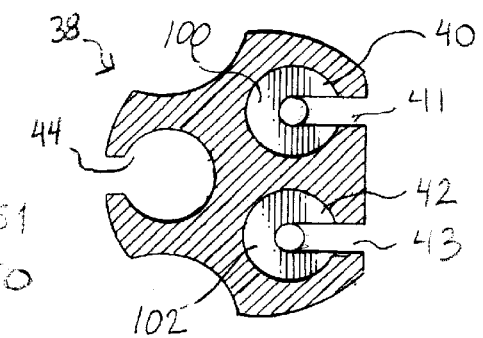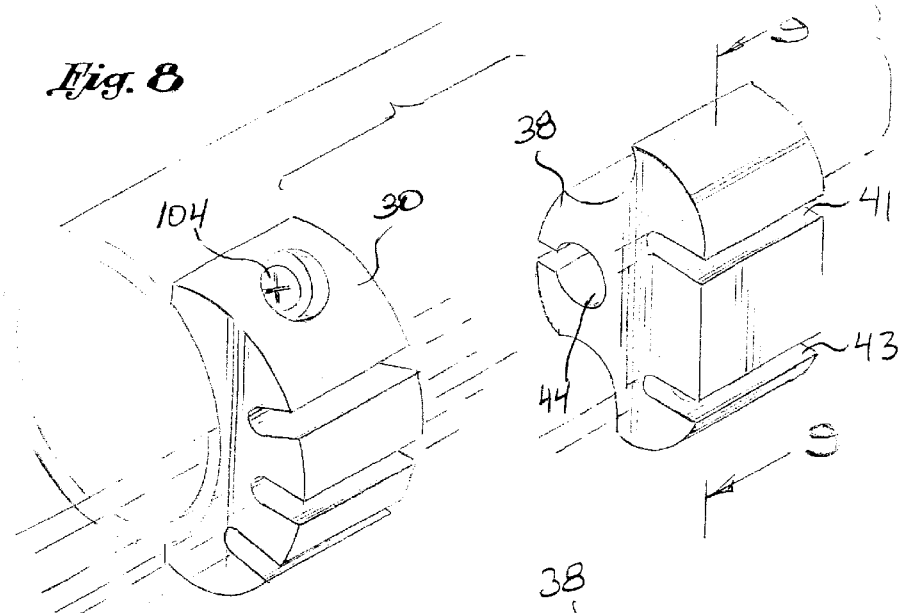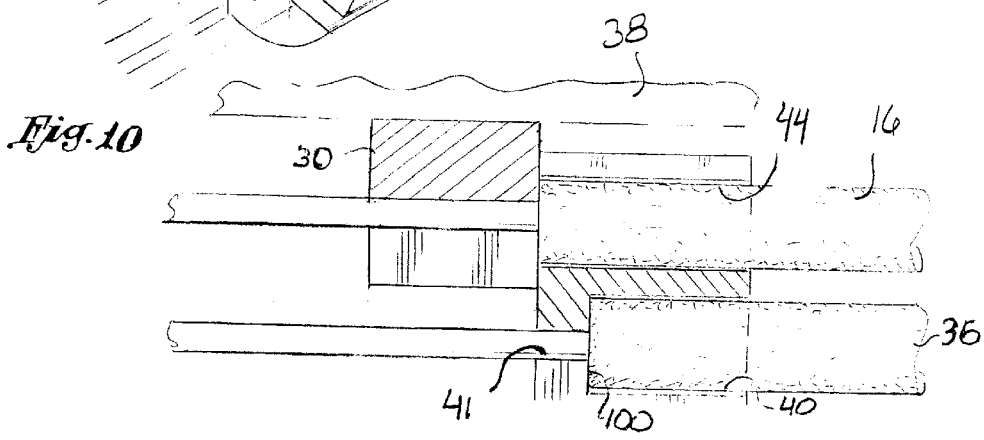

CABLE JOINING SYSTEM FOR CYCLES

CROSS-REFERENCE TO RELATED APPLICATIONS

Not applicable.

STATEMENT RE: FEDERALLY SPONSORED RESEARCH/DEVELOPMENT

Not applicable.

BACKGROUND OF THE INVENTION

FIELD OF THE INVENTION

The present invention relates generally to the field of bicycles, and more specifically, to control systems such as brake, gear and transmission, and other systems employing wire and cables for use therewith.

Braking systems used for cycles and other vehicles, such as bicycles typically comprise two principle types. One type, known as a coaster brake, includes braking components conventionally housed in the hub of the rear wheel of the bicycle and is operated by pressing on the bicycle pedals in a direction rotationally opposite to the forward pedaling direction to achieve the desired braking operation. The other type of bicycle brake system is known as a caliper brake. Caliper brakes are comprised of dual opposing caliper levers connected for cooperative pivoting motion to the bicycle frame to encompass corresponding opposing circumferential portions of the wheel rim to which a tire is mounted, whether front-wheel mounted or rear-wheel mounted, so that the brake pad-lined ends of the opposing caliper levers are spaced apart from corresponding sides of the wheel rim to which they are closely positioned in the un-braked position. The lever system of the caliper brake operates when the caliper lever ends are squeezed together into a braking position by a brake cable that is pulled when the bicycle rider squeezes an operatively-connected brake hand lever mounted on the handlebars of the bicycle. The squeezing motion causes the brakes to be applied by providing frictional contact between the brake pads levers and the front and/or rear wheel rims according to the installed braking configuration, and hence the desired braking performance depending on the pulling force exerted by the rider. Disc brake systems are also known to be used with bicycles. No matter the type of braking system, cabling system requirements are substantially similar in that a tension is required to actuate the bakes, provided through the cable.

The above-described brakes are thus considered to provide an efficient motion-retarding mechanism for slowing and stopping a bicycle. However, the traditional placement of the brake hand levers about the handlebars of the bicycle may not be optimal for ready, convenient operation when the rider is astride a mountain bike or a street bike (on-road or off-road), whether mountain biking or traveling over long distances because of the differing positions adopted by the rider depending on terrain and slope. In particular, the rider may adopt a standing, hunched-over, or semi-standing position when riding uphill, downhill or over rugged terrain, and thus must retain his balance by altering his grip on different portions of the handlebars and in differing positions when gripping those portions in contrast to the conventional sitting or cruising position to which hand brake levers are commonly oriented. Thus, an important limitation in the related art is the failure to accommodate the rider by providing direct access to appropriately positioned brake hand levers in the most significant of those varying riding positions, with commensurate compromises in rider control in those different positions not directly adjacent to the conventionally-placed hand brake levers.

Therefore, it is desirable to provide an improved cable-handling system for use with cycles that overcomes these prior art shortcomings.

SUMMARY OF THE INVENTION

The present invention provides an important improvement in the bicycle-brake system art, by providing a supplemental apparatus for operationally connecting an auxiliary bicycle brake actuator apparatus to an existing bicycle brake system, thereby overcoming the prior art shortcomings described above. More specifically, the invention includes a cable joining system for adding additional manual interface (s), i.e. brake hand lever with connecting elements, for use with an existing braking device and system and thus providing enhanced brake system operability by the bicycle rider in additional riding positions, such as those intermediate positions commonly adopted by street bike riders and mountain bike riders. This improvement is readily achieved by retrofitting the original braking system with the supplemental braking apparatus, without cutting or otherwise destructively modifying the existing cable system provided on the bicycle. Accordingly, the supplemental brake lever mechanism may be positioned to be readily operated by the rider in an alternate riding position not previously amenable to direct operation of a selected front wheel or rear wheel brake system.

As installed, the inventive system is secured to the frame of the cycle (such as a bicycle, tricycle, quadricycle, scooter, which may be pedal-powered, motor assisted or a hybrid thereof) having an existing brake system with forward and rear cable stops provided at spaced intervals along the top tube or other structural element of the cycle. Such structural element may further include a handlebar, fork, seat post or even the fork structure, i.e., any member other than a rotational member such as a wheel. Accordingly, such structural element is utilized to secure one or more brake wires (and optionally, gear shifting wires) therealong, and it will be understood that all references to "brake" wires will encompass control wires for gearing and transmission systems or other systems for use with the cycle. It will be further understood that further references to "bicycle" hereafter includes all of the above-listed species of vehicles including cycles. According to the invention, an auxiliary brake handle (actuator) is secured to the handlebars of the bicycle and a newly installed auxiliary brake wire, connected to the auxiliary brake handle, is secured to the main brake wire. According to the invention, the newly installed auxiliary brake wire and main brake wire are assembled and secured in a "Y" configuration between the forward and rear cable stops, with a clamp serving as a joining node for securing the auxiliary brake wire to the main brake wire. Accordingly, the present invention causes activation of the auxiliary brake wire, now directly secured to and linked with the main brake wire, upon an actuation of the auxiliary brake system, to subsequently cause a pull upon the main brake wire to initiate braking operation of the operatively connected brake calipers and provide the desired braking action of the corresponding wheel, while also preserving operability of the brake system by the main brake handle.

Thus, according to the invention, the cable joining system of the present invention allows a user to add yet additional manual interfaces for additional cable-based devices (brakes, gearing, etc.) without cutting or modifying the existing cable system or operability of the calipers or braking performance. Indeed, the invention provides enhanced brake system operability by virtue of the rider's more direct control and proximity to the auxiliary brake handle in riding positions different from the singular position (cruising) to which most brake systems are installed. The inventive system comprises four elements: 1) a housing joiner, 2) an interconnecting auxiliary brake cable or wire, 3) a clamp for joining the interconnecting brake cable or wire any cycle-mounted operational cable or wire, and 4) lever or actuator for actuating the auxiliary brake cable or wire. The housing joiner and clamp (such as a bullet clamp) cooperatively function with the existing cable stops provided on the bicycle frame, so that the two manual interfaces may independently operate the calipers of the selected brake system.

The invention thus provides a significant advancement in the art, as it is a simple method of adding an after-market braking system (or gearing system or other cable/wire actuated system) interface to an existing bicycle braking system utilizing a brake cable system including a brake wire sheathed in a cable housing. The method of system installation of the present invention is achieved by squeezing together the calipers of the selected brake system to release the tension of the main brake wire and housing (sheath), thereby enabling unhooking of the cable housing from the cable stops while retaining the brake wire in the installed adjusted position. The housing joiner is then attached to the cable housing in front of the forward cable stop. Thereafter, the caliper brake is then reinstalled to its original installed position. The new, auxiliary, brake wire is extended from the housing joiner to interconnect with the main brake wire at a point forward of a second cable stop. System tension is reestablished by pulling the new cable toward the back of the bike, and connecting the two cables with a clamp. It is contemplated that installation of the auxiliary braking system may be easily and readily and rapidly achieved by a layperson. The system may likewise be readily and rapidly detached by reversing these installation steps, thereby restoring the bicycle to its original condition. More specifically, precise adjustment of the brake wire is critical to predictable braking characteristics, including braking tension and release clearances when unbraked, and maintaining this precision adjustment is of significance during attachment of the supplemental system of the present invention.

It should be noted and understood that with respect to the embodiments of the present invention disclosed herein, the materials, methods, apparatus and processes disclosed and suggested may be modified or substituted to achieve the desired protected structures without departing from the scope and spirit of the disclosed and claimed invention.

BRIEF DESCRIPTION OF THE DRAWINGS

FIG. 2 is an enlarged view of the front section of the top tube shown in FIG. 1, showing a first cable stop engaging a dual housing joiner of the cable joining system of the present invention.

FIG. 3 is a cross-sectional view taken through section 3—3 of FIG. 2.

FIG. 4 is a cross sectional view of a single housing joiner shown in FIG. 1 of the present invention.

FIG. 7 is a cross-sectional view of the single housing joiner taken through section 7—7 of FIG. 4.

FIG. 8 is an exploded view of the first cable stop engaging a dual housing joiner of the cable joining system of the present invention shown in FIG. 2.

FIG. 9 is a cross-sectional view of the double housing joiner taken through section 9—9 of FIG. 8.

FIG. 10 is a cross-sectional view of the double housing joiner taken through section 10—10 of FIG. 3.

DETAILED DESCRIPTION OF THE INVENTION

The detailed description as set forth below in connection with the appended drawings is intended as a description of the presently preferred embodiments of the present invention, and is not intended to represent the only form(s) in which the present invention may be constructed or utilized. The description sets forth functions and sequence of steps for constructing and operating the invention in connection with the illustrated embodiments. It is understood, however, the same or equivalent functions and sequences may be accomplished by different embodiments and that they are also intended to be encompassed within the spirit and scope of this invention.

Figure 1:
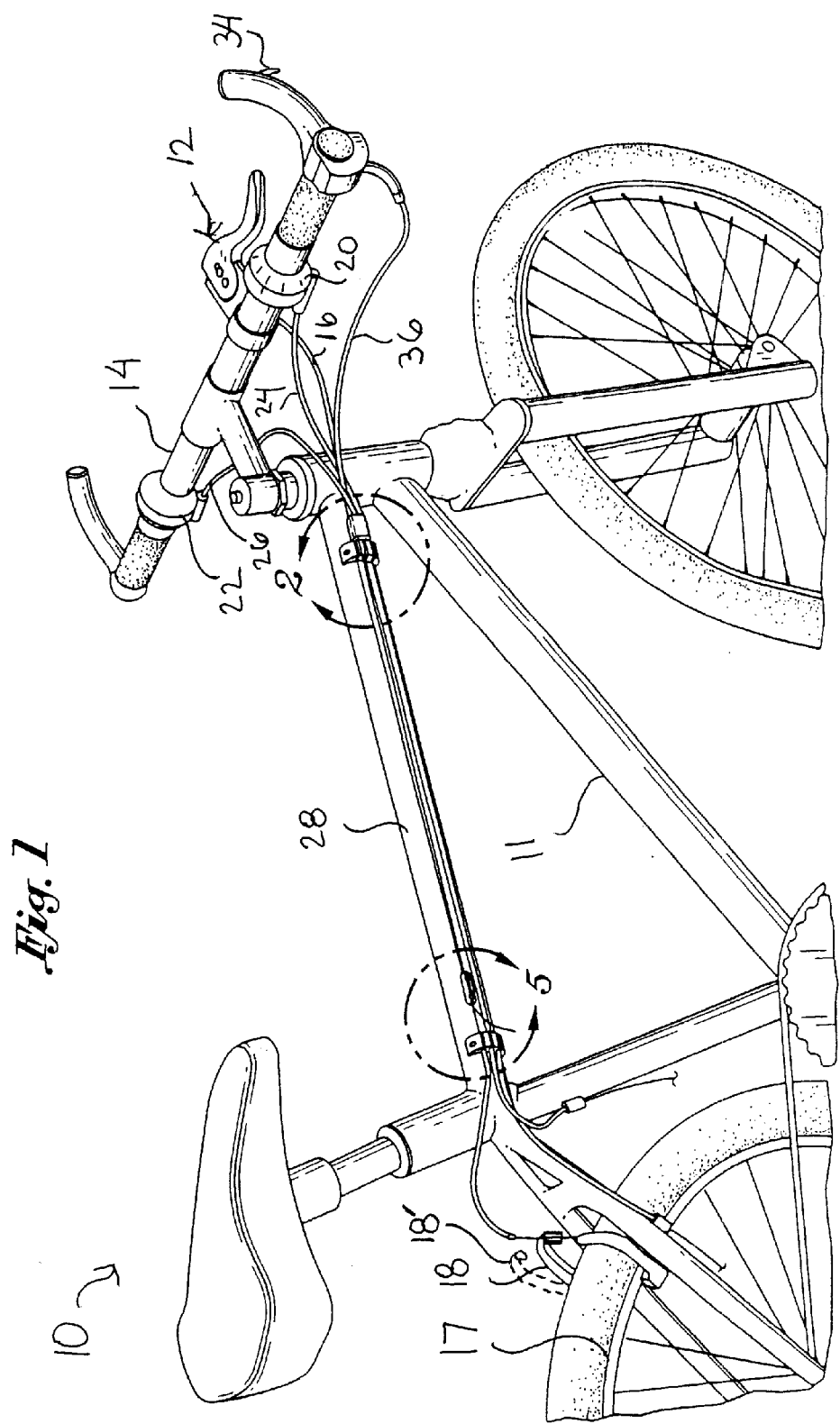
FIG. 1 is a partial perspective view of a bicycle equipped with an auxiliary braking system of the present invention, shown mounted to the top tube of the bicycle.

With reference now to the drawing figures, there is shown in FIG. 1 a bicycle 10 having a frame 11 for supporting the necessary and desired components thereto. Bicycle 10 may be any type of bicycle including one selected from the types commonly referred to as on-road, off-road, hybrid, and mountain bikes. At least one hand brake lever 12 is secured for operation to handlebars 14 of bicycle 10, or alternatively or in addition thereto to another structural member of the frame 11 such as the top tube. Such structural element may further include a handlebar, fork, seat post or even the fork structure, i.e., any member other than a rotational member such as a wheel. A brake wire 16 interconnects the hand brake lever 12 to a braking system, such as rear braking system 18 shown in FIG. 1, for operating the system such as a caliper brake system, which is secured for operation about rear wheel 17. It will be appreciated that the braking system shown in FIG. 1, and the auxiliary braking system of the present system, also may be installed on the front wheel of the bicycle. It will be understood that the term brake wire as used herein may be contained along a substantial length thereof in a sheathing to form a brake cable. Also shown are first gear actuator 20 and a second gear actuator 22. The first gear actuator 20 is interconnected to a gear shifting mechanism (not shown) via gear wire 24. Likewise, the second gear actuator 22 is interconnected to a rear gear mechanism (not shown) through second gear wire 26.

All of the wires for the rear braking system 18 and gear systems are secured to a structural element of the bicycle frame 11 such as a top tube 28 via a forward stop 30 and a rear stop 32. Each stop includes wire guides to allow the wires to run along the top tube 28 and not interfere with the operation of the bicycle by the rider. Additional detail of the forward stop 30 will be further described below in connection with FIGS. 2 and 3, as will additional detail of the rear stop 32 in connection with FIGS. 5 and 6.

With reference now to FIGS. 2–6, forward stop 30 (FIG. 2) and rear stop 32 (FIG. 5), also known as cable stays and wire looms, serve to secure the brake wires and brake housings and/or wires along the top tube 28. Such stops 30, 32 are typically found on bicycles and may be found in the prior art, and may be affixed to the top tube 28 by brazing, soldering or via fastener such as a screw 104 secured thereto. The present invention takes advantage of the configuration of the forward and rear stops 30 and 32, respectively, by tapping into the existing first brake cable 16 to allow the auxiliary brake 34 and its auxiliary brake wire 36 to "piggyback" existing brake wire 16 to operate the caliper 18. The auxiliary brake 34 is attached, for example, to handlebars 14, but alternatively may be secured to another structural member of the bicycle 10 as previously described. The auxiliary brake wire 36 optionally includes a lug provided at the forward end of the wire 36 for "quick-release" engagement/disengagement with a counterpart receiving cavity provided in the housing of the auxiliary manual actuator as will be apparent to the skilled artisan, the lugged end being removable upon a release of the tensioned brake wire 36 in the fully installed condition.

Referring particularly to FIGS. 2 and 3, the forward stop 30 is shown in greater detail. Forward stop 30 is secured to the top tube 28 in one of the manners previously described, and includes in disclosed form three wire-receiving channels 31, for receiving brake wire 16, gear wire 24, and gear wire 26.

The housing joiner 38 of the present invention includes three channels 40, 42 and 44 formed or otherwise provided therein. As will be appreciated by the skilled artisan, housing joiner 38 is fabricated of a strong, lightweight metallic or non-metallic material including but not limited to aluminum, titanium, or stainless steel alloys, rubber, plastics or shock-resistant ceramics for providing high strength characteristics with minimal weight penalty. It will be further appreciated that the housing joiner 38 may be fabricated of a non-metallic polymeric or ceramic construction to meet these requirements. The channel 44 extends the entire longitudinal extent of the housing joiner 38 in the installed condition to allow passage of the appropriate cable housing installed therethrough while channels 40, 42 include stops 100 and 102, respectively, to secure a cable housing against longitudinal travel when the cable is actuated. Stops 100, 102 internal to the housing joiner 38 allow the housing joiner 38 to engage the brake wire 16 within channel 44 installed through a channel opening 46. The housing joiner 38 is held in place by the sheathing of the brake cable 16 on one side and is securely abutted against the forward side of the forward cable stop 30.

With reference to FIGS. 8–10, the auxiliary brake cable 36 is threaded through channel 40 of the joiner housing 38, and optionally through a longitudinal channel opening 41 sized to receive at least the wire thickness or even the entire thickness of the encapsulated wire. A second channel 42 is additionally provided for the connection of other auxiliary components such as an additional braking system or an additional gear system, optionally through a longitudinal channel opening 43 in the manner provided for longitudinal channel opening 41. An alternate embodiment of the housing joiner 38 is shown in FIG. 4 which includes two apertures. Alternate housing joiner 48 includes channels 50 and 52. Channel 50, having longitudinal channel opening 51, engages the brake wire 16 while the channel 52 engages the auxiliary brake cable 36 within bore 53. One or more additional cable—receiving channels may be provided for providing additional means for installing auxiliary brake cable 36 without requiring threading of the optional wire/cable through a closed-bore channel.

Accordingly, the housing joiner 38 is sized and configured to engage the brake wire housing 16 snugly, and also to securely to allow for the securing of the auxiliary brake cable 36 within channel 40, while avoiding interference with other cables secured by forward stop 30 and/or joiner 38, such as gear cables 24 and 26. Furthermore, housing joiner 38 may be provided with a shaped periphery having shaped concavities 47 for avoiding, for example, gear wire 24. In turn, this shaped configuration provides for tighter packaging of the auxiliary apparatus, thereby further reducing weight, size, and rider interference concerns. It will be further appreciated that housing joiner 38 optionally in cooperation with forward stop 30 may receive and secure wires/cables for gearing control systems and/or additional accessories such as speedometer wires, electrical wires or other wires, cables or conduits to be secured to the bicycle.

Figure 5:
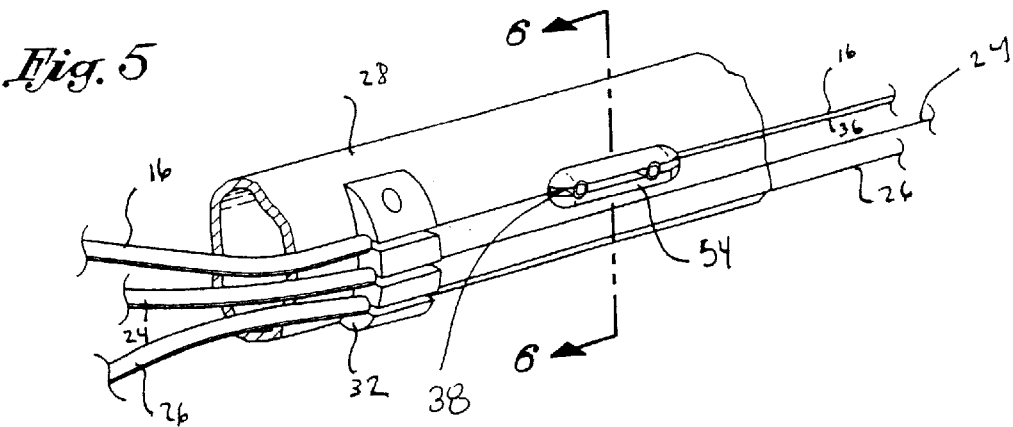
FIG. 5 is an enlarged view of the rear section of the top tube shown in FIG. 1, showing a second cable stop and wire-joining clamp according to the cable joining system of the present invention.
Figure 6:
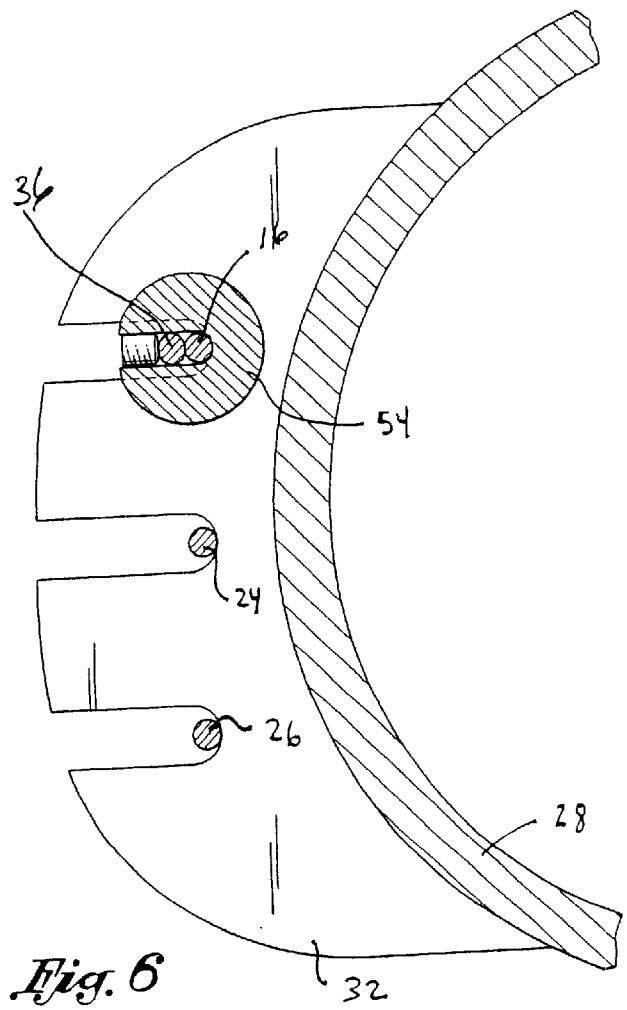
FIG. 6 is a cross sectional view taken through section 6—6 of FIG. 5.

Now referring to FIGS. 5 and 6, there is shown a rear cable stop 32. A clamp 54, such as a so-called bullet clamp that secures the end or even a longitudinal extent of the auxiliary brake cable 36 not necessarily at the end of the brake cable 16, to the main brake cable 16 in a Y-shaped configuration. Other types of clamps 54 or securing devices may be employed for this purpose as will be apparent to the skilled artisan. Because the auxiliary brake cable 36 is secured to the main brake cable 16 in that Y configuration via the bullet clamp 54, when the auxiliary braking mechanism 34 is engaged it will pull the brake wire 16 to engage the caliper brakes 18. Thus, cable brake 16 is mechanically interconnected to both the main brake mechanism 12 and the auxiliary brake mechanism 34. It will be noted that either brake lever (hand brake lever 12 or auxiliary brake lever 34) is independently operable to achieve the desired braking operation. Accordingly, the inventive apparatus may be quickly and efficiently installed without requiring any modification to the bike structure.

The method of system installation of the present invention is achieved by squeezing together the calipers of the selected brake system 18 to release the tension of the main brake wire and housing (sheath), thereby enabling unhooking of the cable housing from the cable stops while retaining the brake wire in the installed adjusted position. In the released configuration, the calipers 18' of the brake system 18 are shown positioned away from the rear wheel 17. The housing joiner 38 is then attached to the cable housing 16 in front of the forward cable stop 30. Thereafter, the caliper brake 18 is then reinstalled to its original installed and operative position. The new, auxiliary, brake cable or wire 36 is extended from the housing joiner 38 to interconnect with the main brake wire 16 at a point forward of a second cable stop. System tension is reestablished by pulling the new, auxiliary, brake cable or wire 36 toward the back of the bike in the general direction of the brake system 18 to which it will ultimately control, and connecting the two cables 16, 36 with clamp 54. It is contemplated that installation of the auxiliary braking system of the present invention may be easily, readily and rapidly achieved by a layperson in the field. The system may likewise be readily and rapidly detached by reversing these installation steps, thereby restoring the bicycle to its original condition, without affecting previously adjusted braking tension and release clearance characteristics.

It is to be understood that the present invention is not limited to the embodiments described above, but encompasses any and all embodiments within the spirit and scope of the following claims.

What is claimed is:

1. In a braking system for a cycle having a primary actuator, a brake caliper for engaging and causing a braking action to a wheel mounted to the cycle, and an interconnecting brake wire by which selective actuation of the primary acutator causes engagement of the brake caliper with the wheel, a longitudinal extent of the interconnecting brake wire supported between a forward cable stop and rear cable stop, the invention comprising:

an auxiliary manual actuator adapted to be secured to a non-rotatable structural element of the cycle; and an auxiliary brake wire having first and second ends, the first end adapted to be secured to the auxiliary manual actuator and the second end adapted to be secured to the interconnecting brake wire by a clamp at a location on the interconnecting brake wire between the forward cable stop and the rear cable stop, and a housing joiner for retaining selected brake wires forward of the forward cable stop, wherein the housing joiner includes a first end and a second end, and at least two channels extending through said housing joiner from said first end to said second end, the first channel adapted to receive the interconnecting brake wire at a point forward of the forward brake cable stop and the second channel adapted for receiving the auxiliary brake wire wherein said second end of said housing joiner is abutted against the first cable stop.

2. The cycle braking system as recited in claim 1, wherein the auxiliary manual actuator is secured to a handle bar provided on the cycle.

3. The cycle braking system as recited in claim 1, wherein the second end of the auxiliary brake wire is removably secured to the interconnecting brake wire.

4. The cycle braking system as recited in claim 3, wherein the clamp for securing the second end of the auxiliary brake wire is a removable clamp.

5. The cycle braking system as recited in claim 4, wherein the clamp is a bullet clamp.

6. The cycle braking system as recited in claim 1, wherein at least one of the forward cable stop and the rear cable stop is secured to a top tube of the cycle.

7. The cycle braking system as recited in claim 1, wherein the clamp is a bullet clamp for securing the second end of the secondary brake wire to the interconnecting brake wire.

* * * * *